(12) United States Patent
Greer et al.

(10) Patent No.: US 11,487,471 B2
(45) Date of Patent: Nov. 1, 2022

(54) STORAGE DEVICE WITH CLIENT RECONFIGURABLE PROTOCOL

(71) Applicant: Intel Corporation, Santa Clara, CA (US)

(72) Inventors: Teddy Greer, Fremont, CA (US); Joseph Tarango, Longmont, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/998,533

(22) Filed: Aug. 20, 2020

(65) Prior Publication Data

US 2020/0379687 A1 Dec. 3, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2019/0121768 A1* | 4/2019 | Coglitore | G06F 13/387 |
| 2020/0151662 A1* | 5/2020 | Estill | G06Q 10/0836 |

OTHER PUBLICATIONS

NVM Express Workgroup, "NVM Express Base Specification", NVM Express Revision 1.4, Jul. 10, 2019, 403 pgs.

* cited by examiner

*Primary Examiner* — Scott C Sun
(74) *Attorney, Agent, or Firm* — Haley Guiliano LLP (57) ABSTRACT

An embodiment of an electronic apparatus may include one or more substrates, and logic coupled to the one or more substrates, the logic to control access to a persistent storage media based on one of a first access protocol and a second access protocol that is different from the first access protocol, and select between the first access protocol and the second access protocol at runtime based on a user configurable parameter. Other embodiments are disclosed and claimed.

20 Claims, 8 Drawing Sheets

STORAGE DEVICE WITH CLIENT RECONFIGURABLE PROTOCOL

BACKGROUND

Communication between electronic devices is generally governed by protocols to provide interoperability between devices manufacturers. Example protocols utilized for storage devices include AT attachment (ATA), parallel ATA (PATA), serial ATA (SATA), integrated device electronics (IDE), small computer system interface (SCSI), serial attached SCSI (SAS), peripheral connect interface (PCI), PCI express (PCIe), nonvolatile memory express (NVMe), Universal Serial Bus (USB), Ethernet (IEEE 802.3), Bluetooth, WiFi (IEEE 802.11), etc.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; flash memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
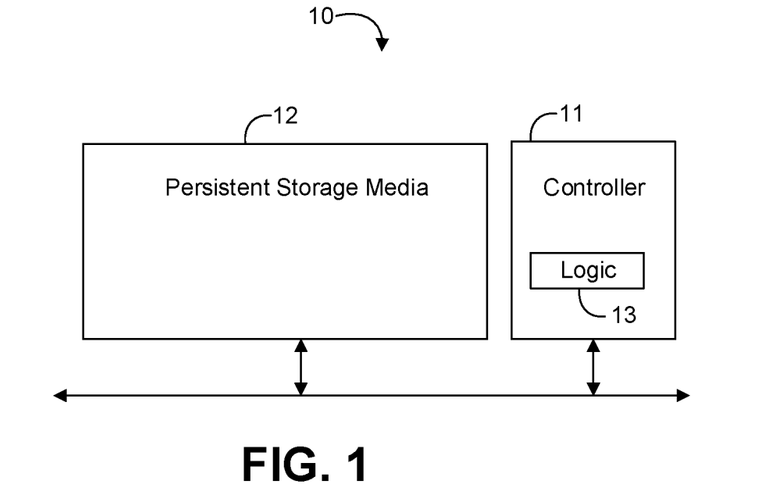
FIG. 1 is a block diagram of an example of an electronic storage system according to an embodiment.

With reference to FIG. 1, an embodiment of an electronic storage system 10 may include persistent storage media 12, and a controller 11 communicatively coupled to the persistent storage media 12. The controller 11 may include logic 13 to control access to the persistent storage media 12 based on one of a first access protocol and a second access protocol that is different from the first access protocol, and select between the first access protocol and the second access protocol at runtime based on a user configurable parameter. For example, the second access protocol may comprise one of a different version and a different set of commands as compared to the first access protocol. In some embodiments, the logic 13 may be configured to provide a first processor to generate a set of common commands based on the first access protocol to control access to the persistent storage media 12, provide a second processor in parallel with the first processor to generate a set of common commands based on the second access protocol to control access to the persistent storage media 12, and access the persistent storage media 12 based on the set of common commands Some embodiments may support even more protocols (e.g., a third protocol, a fourth protocol, or more generally N protocols where N>1). Similarly, some embodiments may more generally provide M processors where M>1.

In some embodiments, the logic 13 may be configured to reconfigure the second processor based on one or more of a physical function, data transformation, a virtual function, a namespace, a physical block address range, and a logical block address range associated with a client. Similarly, the logic 13 may be configured to reconfigure the first processor based on one or more of a physical function, data transformation, a virtual function, a namespace, a physical block address range, and a logical block address range associated with a client. For example, the logic 13 may be further configured to maintain one or more configuration state tables and one or more configuration command linkers associated with one or more of the first processor and the second processor, and to reconfigure one or more of a decode and an encode action for one or more of the first processor and the second processor based on the one or more configuration state tables and the one or more configuration command linkers. In some embodiments, the persistent storage media 12 may comprise one or more of NAND-based media and 3D crosspoint media. For example, the persistent storage media 12 and/or controller 11 may be part of a solid state drive (SSD).

Embodiments of each of the above controller 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the persistent storage media 12, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the persistent storage media 12, other persistent storage media, or other system memory may store a set of instructions which when executed by the controller 11 cause the system 10 to implement one or more components, features, or aspects of the system 10 (e.g., the logic 13, controlling access to the persistent storage media 12 based on either the first access protocol or the second access protocol, selecting between the first access protocol and the second access protocol at runtime based on the user configurable parameter, etc.).

Figure 2:
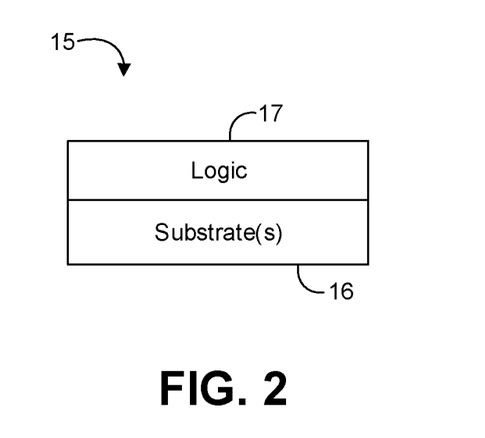
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to control access to a persistent storage media based on one of a first access protocol and a second access protocol that is different from the first access protocol, and select between the first access protocol and the second access protocol at runtime based on a user configurable parameter. For example, the second access protocol may comprise one of a different version and a different set of commands as compared to the first access protocol. In some embodiments, the logic 17 may be configured to provide a first processor to generate a set of common commands based on the first access protocol to control access to the persistent storage media, provide a second processor in parallel with the first processor to generate a set of common commands based on the second access protocol to control access to the persistent storage media, and access the persistent storage media based on the set of common commands.

In some embodiments, the logic 17 may be configured to reconfigure the first and/or second processor based on one or more of a physical function, data transformation, a virtual function, a namespace, a physical block address range, and a logical block address range associated with a client. For example, the logic 17 may be further configured to maintain one or more configuration state tables and one or more configuration command linkers associated with one or more of the first processor and the second processor, and to reconfigure one or more of a decode and an encode action for one or more of the first processor and the second processor based on the one or more configuration state tables and the one or more configuration command linkers. In some embodiments, the persistent storage media may comprise one or more of NAND-based media and 3D crosspoint media. For example, the apparatus 15 may be part of a controller for a SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
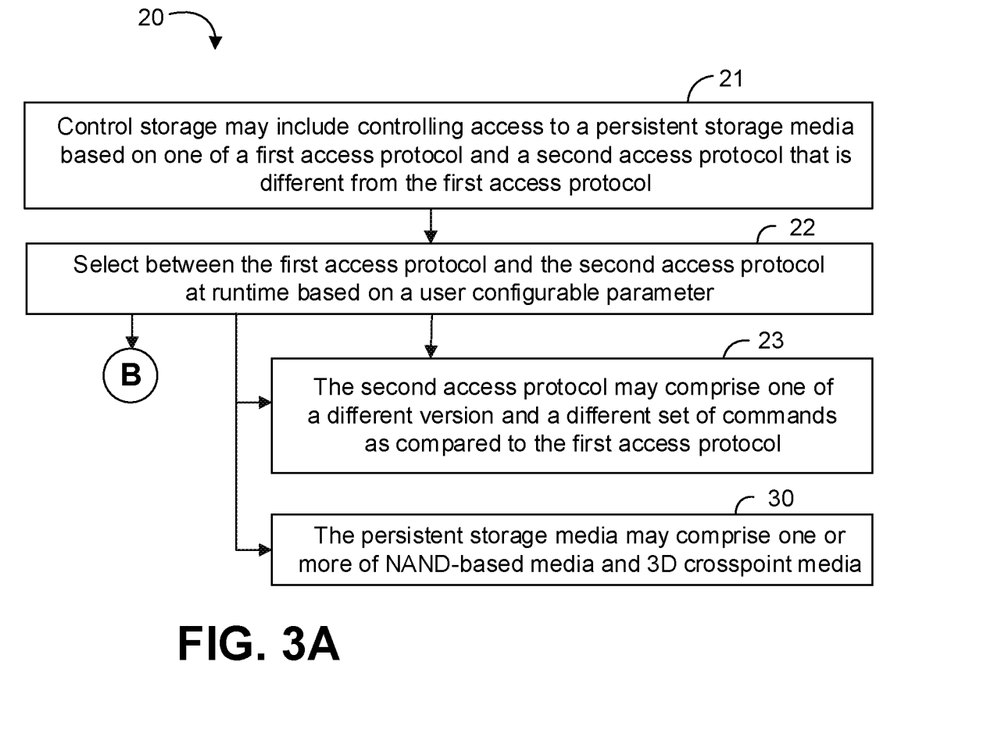
FIGS. 3A to 3B are flowcharts of an example of a method of controlling storage according to an embodiment.
Figure 3B:
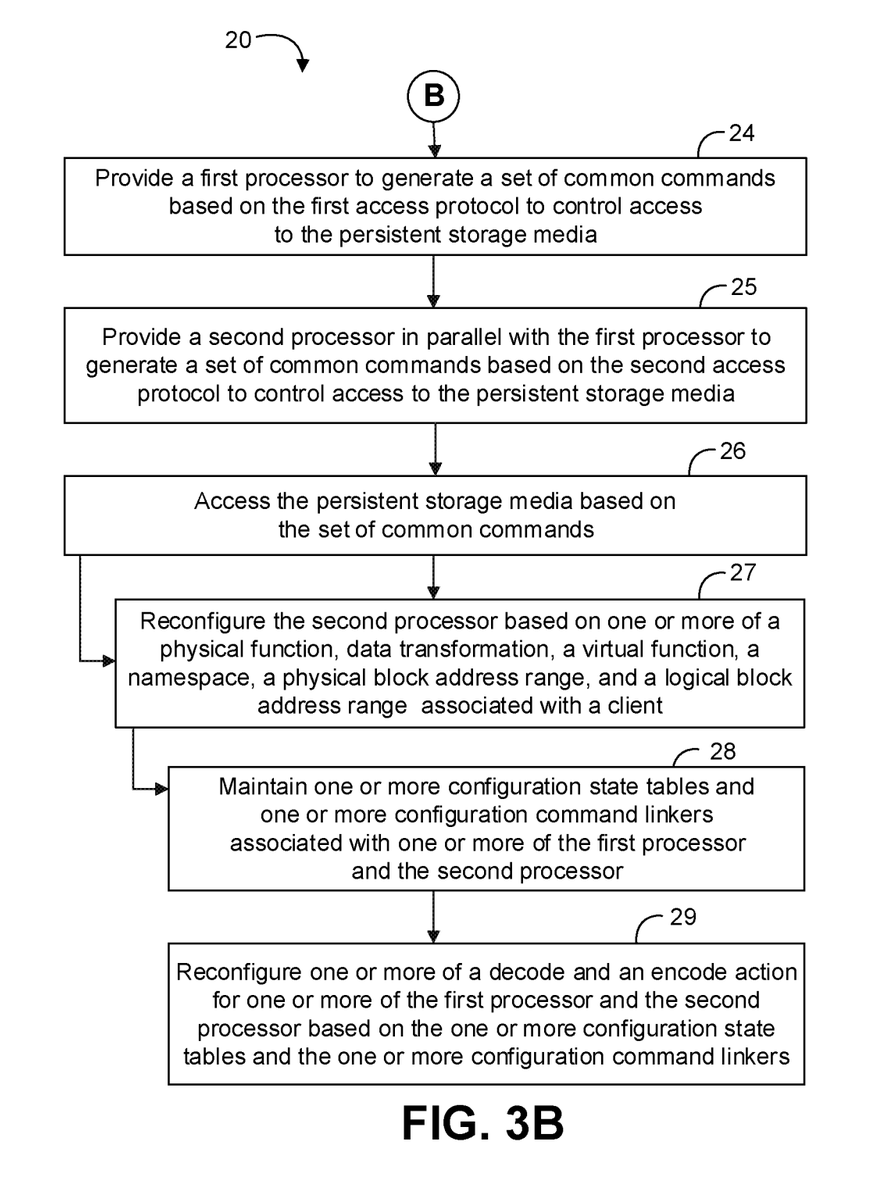

Turning now to FIGS. 3A to 3B, an embodiment of a method 20 of controlling storage may include controlling access to a persistent storage media based on one of a first access protocol and a second access protocol that is different from the first access protocol at box 21, and selecting between the first access protocol and the second access protocol at runtime based on a user configurable parameter at box 22. For example, the second access protocol may comprise one of a different version and a different set of commands as compared to the first access protocol at box 23. Some embodiments of the method 20 may further include providing a first processor to generate a set of common commands based on the first access protocol to control access to the persistent storage media at box 24, providing a second processor in parallel with the first processor to generate a set of common commands based on the second access protocol to control access to the persistent storage media at box 25, and accessing the persistent storage media based on the set of common commands at box 26.

In some embodiments, the method 20 may further include reconfiguring the second processor (e.g., and/or the first processor) based on one or more of a physical function, data transformation, a virtual function, a namespace, a physical block address range, and a logical block address range associated with a client at box 27. The method 20 may also include maintaining one or more configuration state tables and one or more configuration command linkers associated with one or more of the first processor and the second processor at box 28, and reconfiguring one or more of a decode and an encode action for one or more of the first processor and the second processor based on the one or more configuration state tables and the one or more configuration command linkers at box 29. For example, the persistent storage media may comprise one or more of NAND-based media and 3D crosspoint media at box 30.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

NVM Express (NVMe) is a protocol over PCIe or a network. The NVMe revision 1.3 and prior revisions define a register level interface for host software to communicate with a non-volatile memory subsystem over PCIe. The NVMe over Fabrics specification defines a protocol interface and related extensions to the NVMe interface that enable operation over other interconnects (e.g., Ethernet, INFINIBAN, Fibre Channel). The NVMe over Fabrics specification has an NVMe Transport binding for each NVMe Transport (either within that specification or by reference).

Some embodiments may advantageously provide technology for a virtual multi-tenant client reconfigurable NVMe protocol (NVM-R) within a SSD or persistent memory dual-inline memory module (DIMM) (e.g., a DIMM that includes INTEL OPTANE technology, MICRON QUANTX technology, etc.). SSDs used in a virtualized host platform require that all clients use the same protocol or version of a given protocol. As SSDs take on more of the role in virtualization via multiple physical functions, single root input/output virtualization (SR-IOV) virtual functions, single input/output virtualization (SIOV), namespace, or logical block address (LBA) interval range limiting, this shortcoming results in a direct impact on the software and/or driver that a client may employ. For example, the inability of a conventional SSD to alter protocol versions forces all clients to utilize the same protocol, restricting these users and forcing all users to upgrade driver software. Advantageously, some embodiments may provide technology to allow simultaneous protocol variation across virtual clients.

In some embodiments, an additional soft NVMe protocol processor may operate in parallel to primary protocol hardware to allow the user to alter the protocol based on function. For example, some embodiments may enable each of the physical or virtual functions within the SSD to operate at a different NVMe protocol release version (e.g., 1.1, 1.2, etc.) or with an entirely different command set if needed for a particular client. Advantageously, a service provider may permit multiple clients to use the same SSD at different NVMe release versions or even with different command sets rather than forcing all clients to utilize the same release version. Advantageously, an end user (e.g., likely operating as a virtual client) may have greater control over driver versions required to operate the SSD. For example, some embodiments may allow different virtual clients to use different drivers at various times as needed/desired, removing the need to coordinate multiple simultaneous driver upgrades across multiple virtual clients.

Additionally, in some embodiments, a firmware upgrade may be requested by a virtualization provider to enable a protocol version not previously supported by the SSD. At that point, after the drive had shipped and was in the field, it would be possible for the SSD manufacturer to create a firmware update to enable the newly required protocol version. This protocol would need to be verified/certified before the firmware was released to the end customer but would NOT need to be verified/certified at SSD ship time. Advantageously, this added flexibility may extend the useful lifetime of the device.

Figure 4:
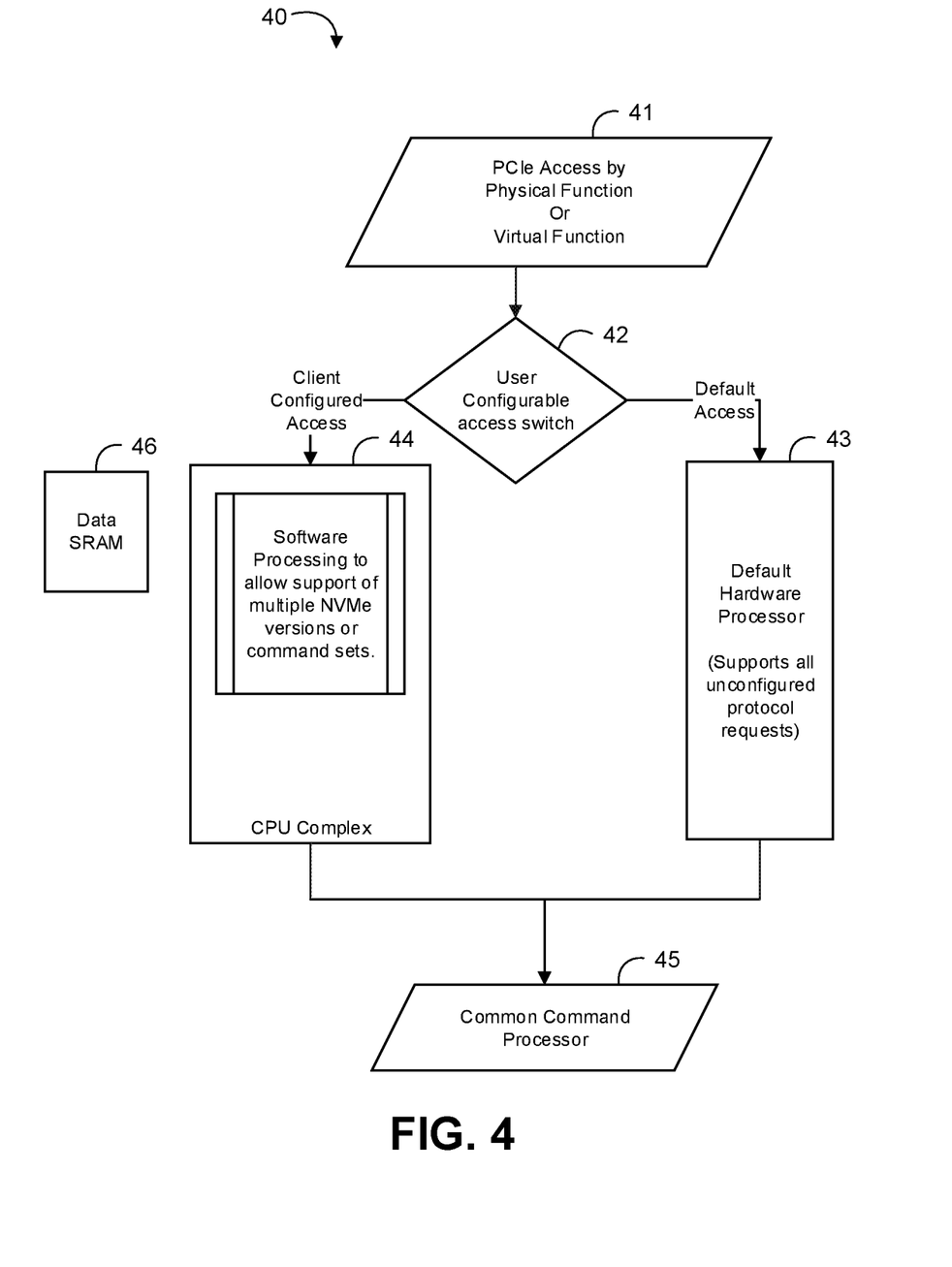
FIG. 4 is a block diagram of an example of a storage controller according to an embodiment.

With reference to FIG. 4, an embodiment of a storage controller 40 may include an interface 41 communicatively coupled to a user configurable access switch 42. The interface 41 may provide PCIe access by a physical function or a virtual function. The user configurable access switch may select between a default access and a client configured access. For example, the switch 42 may be communicatively coupled to a default hardware processor 43 which supports all unconfigured protocol requests. The switch 42 may be further communicatively coupled to a CPU complex 44 which includes software processing to allow support of multiple NVMe versions or command sets. Advantageously, a user may configure one of multiple NVMe protocol versions or command sets depending on physical function, virtual function, namespace LBA range, etc. The default hardware processor 43 and CPU complex 44 may each provide a set of common commands to a common command processor 45. The controller 40 may further include SRAM 46 communicatively coupled to various components of the controller 40 to store data.

In some embodiment, an additional CPU core within a NVMe protocol processing block and a series of data routing mailboxes may enable a user to, through straightforward software/hardware portioning, choose one of multiple supported NVMe protocol versions or varied command sets. For example, the SSD manufacturer may choose which versions or commands sets to support as well as the method of version choice using a flexible soft processor. Advantageously, some embodiments allow the selection of a default NVMe protocol version or command set for general use that is expected to be implemented in hardware, and other protocols to be configured in software to be selected based upon physical function, virtual function, namespace, or LBA range.

Figure 5:
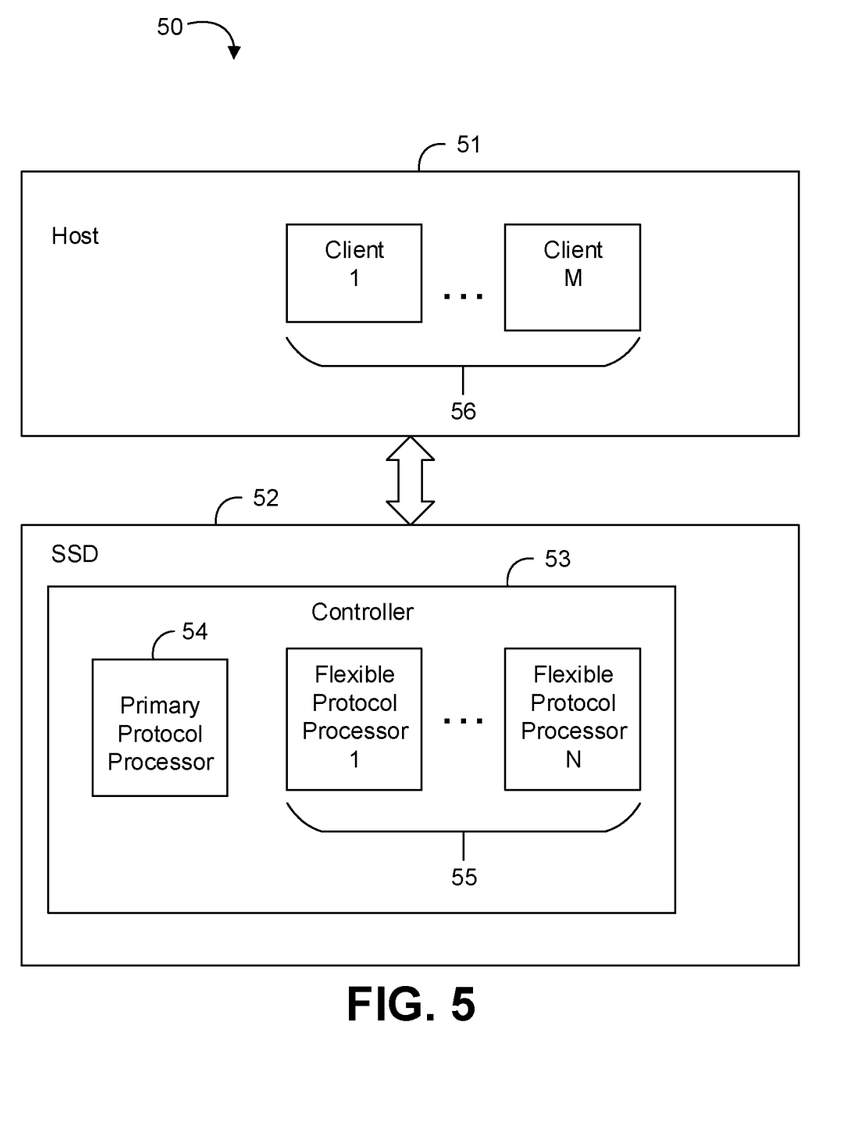
FIG. 5 is a block diagram of an example of a computing system according to an embodiment.

With reference to FIG. 5, an embodiment of a computing system 50 may include a host 51 communicatively coupled to a SSD 52. The SSD 52 may include a controller 53 which includes a primary protocol processor 54 and two or more flexible protocol processors 55 (e.g., flexible protocol processor 1 through N, N>1). The host 51 may include two or more clients 56 (e.g., client 1 through M, M>1). In some embodiments, the controller 53 may be configured to select a respective processor (e.g., one of the primary protocol processor 54 and the two or more flexible protocol processors) for each of the client 56s of the host 51 based on a feature associated with the clients 56. For example, an appropriate flexible protocol processor 55 may be selected based upon a physical function, a virtual function, a namespace, or a LBA range associated with the clients 56. In some embodiments, a vendor unique command (e.g., or a reserved NVMe command) may enable the end user in a virtualized platform (e.g., or the service provider) to configure a SSD to respond to a particular protocol version or command set for each of the clients 56, which allows the end user greater flexibility in driver choice and upgrade times. Advantageously, different physical functions and/or virtual functions may use different NVMe protocol release versions (e.g., or even different command sets).

Figure 6:
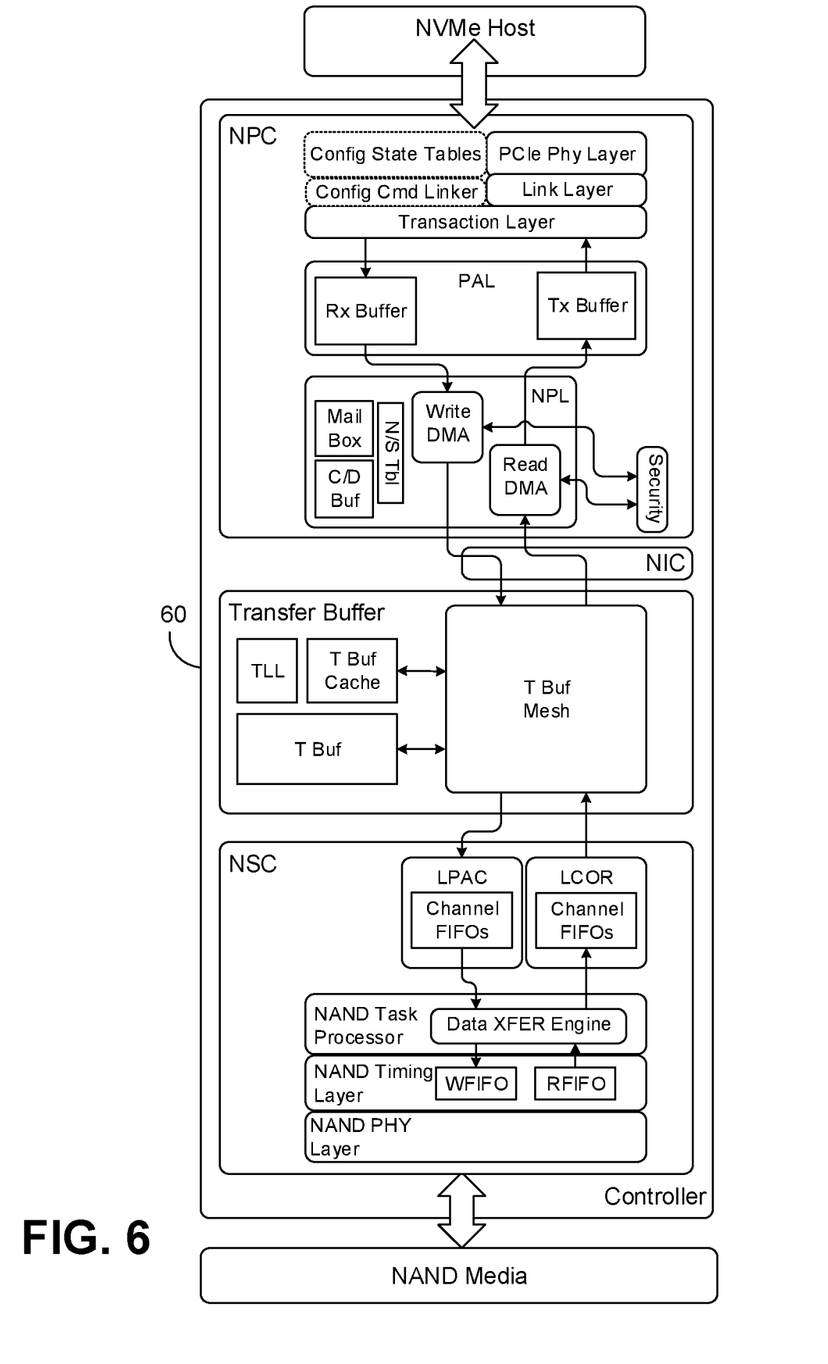
FIG. 6 is a block diagram of another example of a storage controller according to an embodiment.

With reference to FIG. 6, an embodiment of a storage controller 60 may have a high level architecture as illustrated. The storage controller 60 may provide reconfigurability by including configuration state tables and configuration command linkers in parallel with command processing. For example, the state table may be a NVRAM configuration table of the active streams, namespace, and configuration pointers, which may be preloaded at boot or after enumeration through administration command(s). As the commands are being processed, some embodiments may reconfigure decoding action processing engines (DPEs). For example, a storage system may include several reconfigurable engines to allow for concurrent process and throughput increases in the processing of a virtual machine. In some embodiments, the instances of DPEs may be configurable from the virtual machine to achieve the desired performance reported through a performance identification command.

In one example of NVMe version command set semantics, Table 1 shows an example of a direct mapping of a software virtual layer to configuration and identity queue for reconfiguration:

TABLE 1

| Software Virtual Machine | Firmware Reconfigurable Bit Stream Active Slot | Firmware Identity Queue |
|---|---|---|
| NVM Context Driver(s) Library Protocol, Firmware Version | Firmware Configuration Slot Library Firmware Address | Identification Set(s) PF(x), VF(y), NS(z), LBAR(k, j) |
| NVMe 1.3-Intel 1.001 | &NPC__Stream4Config | PF(&PFA[1]), NS(2), LBAR(4, 8) |
| NVMe 1.2-Intel 1.201 | &NPC__Stream2Config | PF(&PFA[3]), NS(1), LBAR(32, 2) |
| NVMe 1.4-Intel 2.001 | &NPC__Stream3Config | PF(&PFA[6]), NS(2), LBAR(64, 16) |
| NVMe 1.0-Intel 0.040 | &NPC__Stream1Config | PF(&PFA[7]), NS(2), LBAR(44, 1) |

For example, the software virtual machine may be defined as the host machine management engine for each of the internal virtual drivers. To simplify operation, the virtual drivers may be software context switched for each virtual machine instance command. The reconfigurable bit stream may correspond to a vendor provided preloaded or user loadable configuration for each of the hardware contexts of processing the individual operation function. In the case of operational functions that have congruent behavior, the performance optimization of not context switching may be optional to increase throughput. For the identify queue, the firmware may include either a soft processing engine to move the set of data through the soft processor and into a command Processing Engine (cPE). The construction of the set may be determined from the input command at the driver layer through a hardware command decoding processor (e.g., from a PCIe latched translation of the set features command for each admin, user, general NVMe request, etc.).

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
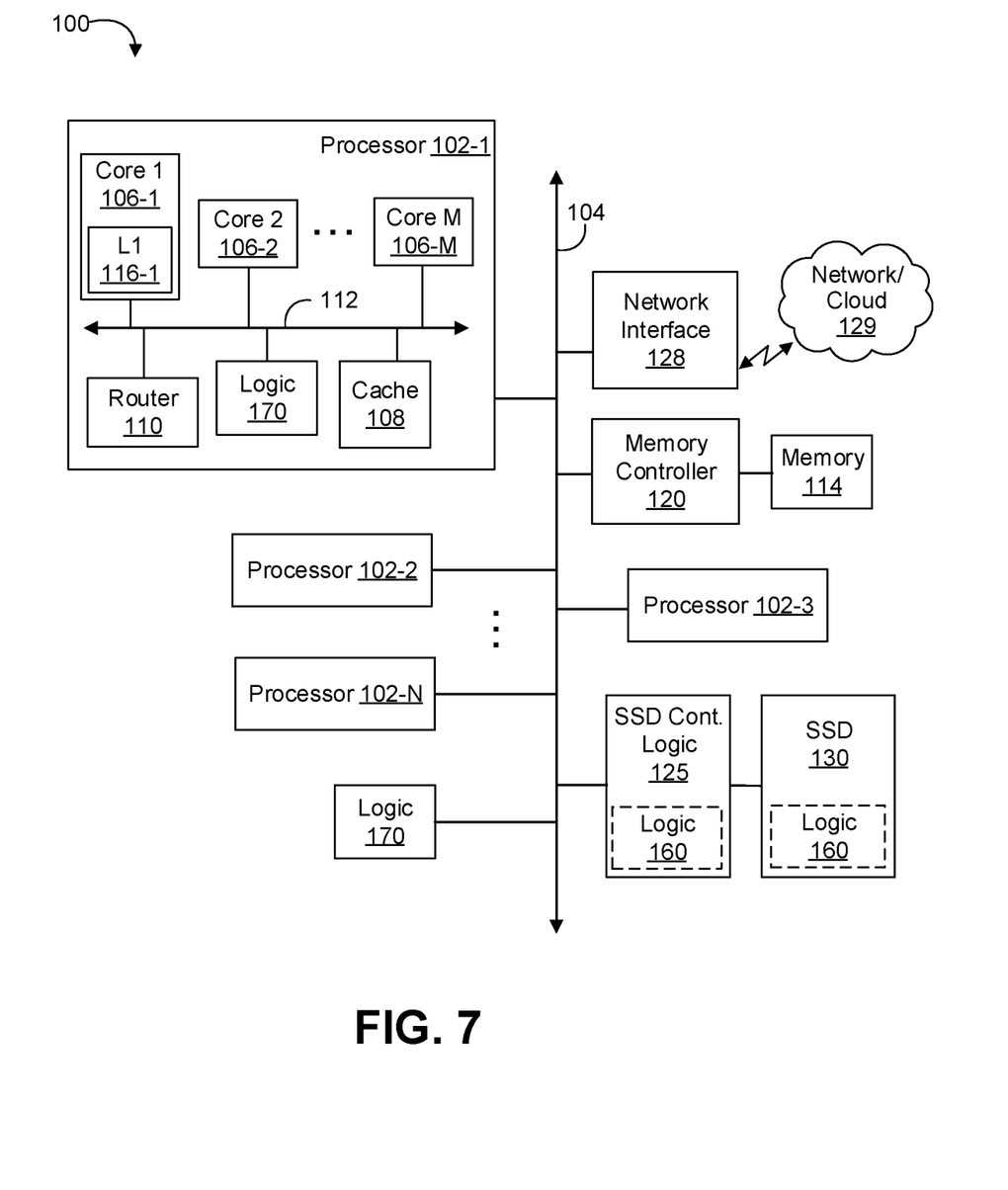
FIG. 7 is a block diagram of an example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 8) or provided on a same integrated circuit (IC) device in various embodiments (e.g., on the same circuit board device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors.

These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 8:
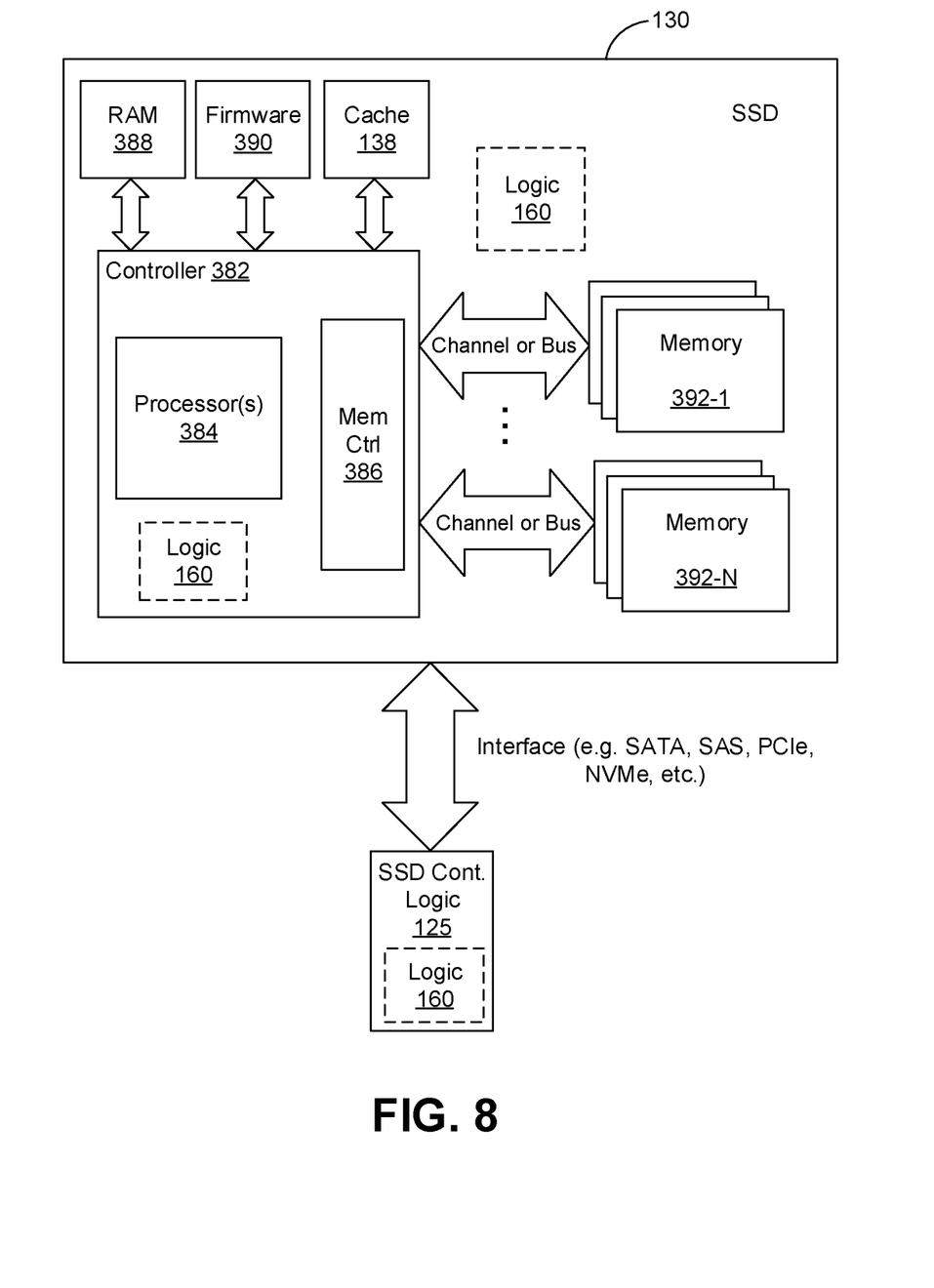
FIG. 8 is a block diagram of an example of a solid state drive (SSD) device according to an embodiment.

FIG. 8 illustrates a block diagram of various components of the SSD 130, according to an embodiment. As illustrated in FIG. 8, logic 160 may be located in various locations such as inside the SSD 130 or controller 382, etc., and may include similar technology as discussed in connection with FIG. 7. The SSD 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include 3D crosspoint, or other types of non-volatile memory). The memory 392 is coupled to the memory controller logic 386 via one or more memory channels or busses. Also, SSD 130 communicates with logic 125 via an interface (such as a SATA, SAS, PCIe, NVMe, etc., interface). Processors 384 and/or controller 382 may compress/decompress data written to or read from memory devices 392-1 to 392-N.

As illustrated in FIGS. 7 and 8, the SSD 130 may include logic 160, which may be in the same enclosure as the SSD 130 and/or fully integrated on a printed circuit board (PCB) of the SSD 130. The system 100 may include further logic 170 outside of the SSD 130. One or more of the features/aspects/operations discussed with reference to FIGS. 1-6 may be performed by one or more of the components of FIGS. 7 and/or 8. Also, one or more of the features/aspects/operations of FIGS. 1-6 may be programmed into the firmware 390. Further, SSD controller logic 125 may also include logic 160. Advantageously, the logic 160 and/or logic 170 may include technology to implement one or more aspects of the system 10 (FIG. 1), the apparatus 15 (FIG. 2), the method 20 (FIGS. 3A to 3B), the controller 40 (FIG. 4), the system 50 (FIG. 5), the controller 60 (FIG. 6), and/or any of the features discussed herein. For example, the logic 170 may include technology to implement the host device/computer system/agent aspects of the various embodiments described herein while the logic 160 may include technology to implement the storage device aspects of the various embodiments described herein.

In particular, the logic 160 may be configured to control access to the memory devices 392 based on one of a first access protocol and a second access protocol that is different from the first access protocol, and select between the first access protocol and the second access protocol at runtime based on a user configurable parameter. For example, the second access protocol may comprise one of a different version and a different set of commands as compared to the first access protocol. In some embodiments, the logic 160 may be configured to provide a first processor to generate a set of common commands based on the first access protocol to control access to the memory devices 392, provide a second processor in parallel with the first processor to generate a set of common commands based on the second access protocol to control access to the memory devices 392, and access the memory devices 392 based on the set of common commands.

In some embodiments, the logic 160 may be configured to reconfigure the second processor based on one or more of a physical function, a virtual function, a namespace, and a logical block address range associated with a client. For example, the logic 160 may be further configured to maintain one or more configuration state tables and one or more configuration command linkers associated with one or more of the first processor and the second processor, and to reconfigure one or more of a decode and an encode action for one or more of the first processor and the second processor based on the one or more configuration state tables and the one or more configuration command linkers. In some embodiments, the memory devices 392 may comprise one or more of NAND-based media and 3D crosspoint media.

In other embodiments, the SSD 130 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of storage media. For example, the bulk of the storage may be NAND and may further include some faster, smaller granularity accessible (e.g., byte-addressable) NVM such as INTEL 3D XPoint media. The SSD 130 may alternatively, or additionally, include persistent volatile memory (e.g., battery or capacitor backed-up DRAM or SRAM). For example, the SSD 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIGS. 7 and 8, features or aspects of the logic 160 and/or the logic 170 may be distributed throughout the system 100, and/or co-located/integrated with various components of the system 100.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds, costs, and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   logic coupled to the one or more substrates, the logic to:
      control access to a persistent storage media in the electronic apparatus based on one of a first access protocol and a second access protocol that is different from the first access protocol, and
      select between the first access protocol and the second access protocol at runtime based on a user configurable parameter.

2. The apparatus of claim 1, wherein the second access protocol comprises one of a different version and a different set of commands as compared to the first access protocol.

3. The apparatus of claim 1, wherein the logic is further to:
   provide a first processor to generate a set of common commands based on the first access protocol to control access to the persistent storage media;
   provide a second processor in parallel with the first processor to generate a set of common commands based on the second access protocol to control access to the persistent storage media; and
   access the persistent storage media based on the set of common commands.

4. The apparatus of claim 3, wherein the logic is further to:
   reconfigure the second processor based on one or more of a physical function, data transformation, a virtual function, a namespace, and a logical and/or a physical block address range associated with a client.

5. The apparatus of claim 4, wherein the logic is further to:
   maintain one or more configuration state tables and one or more configuration command linkers associated with one or more of the first processor and the second processor.

6. The apparatus of claim 5, wherein the logic is further to:
   reconfigure one or more of a decode and an encode action for one or more of the first processor and the second processor based on the one or more configuration state tables and the one or more configuration command linkers.

7. The apparatus of claim 1, wherein the persistent storage media comprises one or more of NAND-based media and 3D crosspoint media.

8. An electronic storage system, comprising:
persistent storage media; and
a controller communicatively coupled to the persistent storage media, the controller including logic to:
control access to the persistent storage media based on one of a first access protocol and a second access protocol that is different from the first access protocol, and
select between the first access protocol and the second access protocol at runtime based on a user configurable parameter,
wherein the persistent storage media and the controller are in an apparatus.

9. The system of claim 8, wherein the second access protocol comprises one of a different version and a different set of commands as compared to the first access protocol.

10. The system of claim 8, wherein the logic is further to:
provide a first processor to generate a set of common commands based on the first access protocol to control access to the persistent storage media;
provide a second processor in parallel with the first processor to generate a set of common commands based on the second access protocol to control access to the persistent storage media; and
access the persistent storage media based on the set of common commands.

11. The system of claim 10, wherein the logic is further to:
reconfigure the second processor based on one or more of a physical function, data transformation, a virtual function, a namespace, a physical block address range, and a logical block address range associated with a client.

12. The system of claim 11, wherein the logic is further to:
maintain one or more configuration state tables and one or more configuration command linkers associated with one or more of the first processor and the second processor.

13. The system of claim 12, wherein the logic is further to:
reconfigure one or more of a decode and an encode action for one or more of the first processor and the second processor based on the one or more configuration state tables and the one or more configuration command linkers.

14. The system of claim 8, wherein the persistent storage media comprises one or more of NAND-based media and 3D crosspoint media.

15. A method of controlling storage, comprising:
controlling access, using logic in an apparatus, to a persistent storage media in the apparatus based on one of a first access protocol and a second access protocol that is different from the first access protocol; and
selecting between the first access protocol and the second access protocol at runtime based on a user configurable parameter.

16. The method of claim 15, wherein the second access protocol comprises one of a different version and a different set of commands as compared to the first access protocol.

17. The method of claim 15, further comprising:
providing a first processor to generate a set of common commands based on the first access protocol to control access to the persistent storage media;
providing a second processor in parallel with the first processor to generate a set of common commands based on the second access protocol to control access to the persistent storage media; and
accessing the persistent storage media based on the set of common commands.

18. The method of claim 17, further comprising:
reconfiguring the second processor based on one or more of a physical function, data transformation, a virtual function, a namespace, a physical block address range, and a logical block address range associated with a client.

19. The method of claim 18, further comprising:
maintaining one or more configuration state tables and one or more configuration command linkers associated with one or more of the first processor and the second processor.

20. The method of claim 19, further comprising:
reconfiguring one or more of a decode and an encode action for one or more of the first processor and the second processor based on the one or more configuration state tables and the one or more configuration command linkers.

* * * * *